United States Patent [19]

Li

[11] Patent Number: 4,630,891
[45] Date of Patent: Dec. 23, 1986

[54] TAMPER RESISTANT SECURITY FILM

[75] Inventor: Wu S. Li, Woodbury, Minn.

[73] Assignee: Minnesota Mining and Manufacturing Company, St. Paul, Minn.

[21] Appl. No.: 650,411

[22] Filed: Sep. 14, 1984

[51] Int. Cl.[4] .............................................. G02B 5/128
[52] U.S. Cl. ..................................... 350/105; 283/94
[58] Field of Search .................. 350/105, 109; 283/94, 283/902, 904

[56] References Cited

U.S. PATENT DOCUMENTS

| | | |
|---|---|---|
| 1,003,443 | 9/1911 | Erickson . |
| 3,631,617 | 1/1972 | Pekko . |
| 4,023,889 | 5/1977 | Eagon et al. ......................... 350/105 |
| 4,070,774 | 1/1978 | Staats et al. . |
| 4,082,873 | 4/1978 | Williams . |
| 4,101,701 | 7/1978 | Gordon ............................... 283/904 |
| 4,180,929 | 1/1980 | Schultz, Jr. .......................... 40/283 |
| 4,429,015 | 1/1984 | Sheptak ............................... 283/904 |

Primary Examiner—John K. Corbin
Assistant Examiner—Loha Ben
Attorney, Agent, or Firm—Donald M. Sell; James A. Smith; Roger R. Tamte

[57] ABSTRACT

Security film comprising a monolayer of transparent microspheres supported in a thin layer of binder material, a pressure-sensitive adhesive layer coated on the layer of binder material, and disposed between the pressure-sensitive adhesive and binder layers, at least one patterned layer that has differential adhesion to the pressure-sensitive adhesive layer and the binder layer such that upon attempted elevated-temperature removal of the film from a substrate the film splits, with part of the film remaining on the substrate and part being removed.

12 Claims, 3 Drawing Figures

TAMPER RESISTANT SECURITY FILM

BACKGROUND OF THE INVENTION

Security films of the type taught in U.S. Pat. No. 3,801,183, (thin easily tearable films which incorporate a monolayer of glass microspheres and a latent image viewable inoretroreflection) sometimes need to be adhered to a substrate with a pressure-sensitive adhesive rather than the preferred heat-activated type. One example is when the security film is applied to a document at various decentralized locations rather than a central location where more expensive heat-laminating equipment is available.

Use of a pressure-sensitive adhesive increases the danger of transfer of the film from one substrate to another document to falsely authenticate that document. The danger does not lie in ordinary room-temperature removal, since aggressive pressure-sensitive adhesives are available that prevent such removal of the quite flimsy security film from a substrate to which it has been applied. Also, the security film uses binder materials that are soluble in any solvent that the pressure-sensitive adhesive is soluble in, so solvent loosening of an applied security film can be prevented.

However, with certain constructions it might be possible to apply heat to a security film to soften the pressure-sensitive adhesive and allow removal of the film, and no one has previously solved that problem.

SUMMARY OF THE INVENTION

The present invention provides a new security film or sheet material that not only resists ordinary room-temperature removal and solvent removal, but also resists elevated-temperature removal from a substrate to which it has been applied. In brief summary, this new security film comprises a monolayer of glass microspheres supported in a thin layer of binder material, the binder material comprising an acrylic low-molecular-weight polymer soluble in nonpolar solvent; a pressure-sensitive adhesive coated onto the binder material; and at least a first patterned layer disposed between the layer of pressure-sensitive adhesive and binder material and covering a portion of the interface between the two layers. The patterned layer comprises either a dye that has lower adhesion to the binder material than to the pressure-sensitive adhesive, or a nonpolar thermoplastic resin that promotes adhesion between the binder material and pressure-sensitive adhesive. Upon exposure of the complete film to an elevated temperature of 100° C. or more, the pressure-sensitive adhesive separates from the binder material in areas covered by the dye, but tends to remain adhered to the binder material in areas covered by the adhesion-promoting resin.

DETAILED DESCRIPTION

Figure 1:
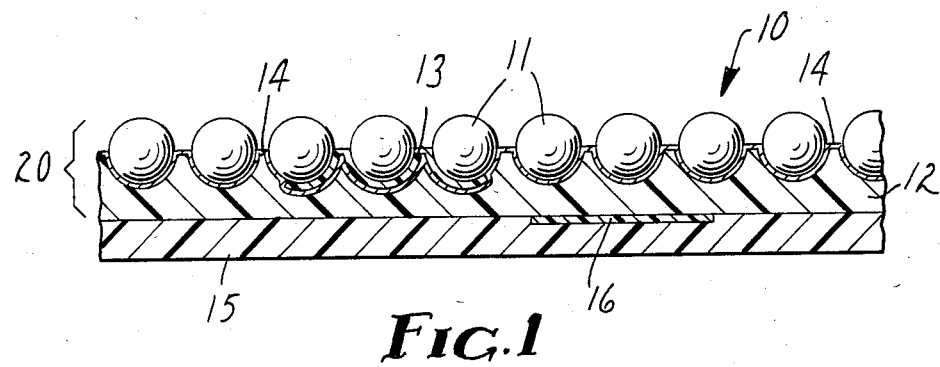
FIGS. 1 and 2 are sectional views through different illustrative security films of the invention.
Figure 2:
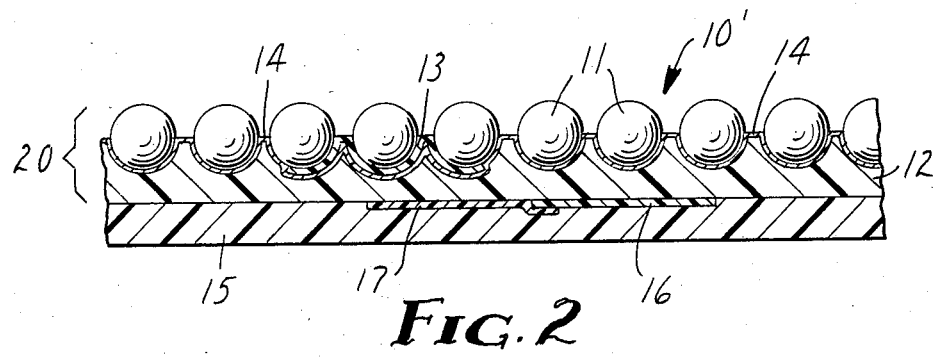

As shown in FIGS. 1 and 2, representative sheet materials or security films of the invention 10 and $10^1$ comprise a monolayer of transparent microspheres 11 supported in a thin layer 12 of binder material. The transparent microspheres 11 are typically glass and have an index of refraction of about 1.9, such that light incident on a microsphere is focused on the back of the microsphere. Printed images 13 and a transparent reflective coating 14 are applied between the backs of the microspheres and the binder material, as taught in U.S. Pat. No. 3,801,183, which is incorporated herein by reference. Preferred transparent reflective coatings are dielectric layers having a thickness equal to only a fraction of the wavelength of light that is desired to be reflected, again as taught in U.S. Pat. No. 3,801,183.

A desired binder material for the layer 12 is an acrylic polymer, i.e., a homopolymer or copolymer of acrylates or methacrylates, which is of low molecular weight, generally less than about 100,000 in molecular weight, and is soluble in nonpolar solvents such as petroleum ether, mineral spirits or VMP naphtha. Such a binder material prevents solvent transfer of a sheet material of the invention, since solvents that would attack pressure-sensitive adhesives used in sheet material of the invention will attack a binder material as described.

Structure as described, which may be identified as the portion 20, has been generally known, and may be made by techniques as taught in U.S. Pat. No. 3,801,183. As shown in the drawing, sheet material of the invention also includes a pressure-sensitive adhesive layer 15 and at least one patterned layer disposed between the layer of binder material and pressure-sensitive adhesive. In the embodiment of FIG. 1 only one patterned layer, 16, is included, but preferably, as shown in FIG. 2, at least two patterned layers 16 and 17 are used.

The pressure-sensitive adhesive layer preferably comprises an acrylic polymer—such as a copolymer of isooctylacrylate and acrylic acid (see U.S. Pat. No. Re. 24,906—dispersed in a liquid such as water for coating onto the binder material. The pressure-sensitive adhesive is preferably applied from latex to avoid solvent damage to the rest of the sheet material, and it preferably has a thickness of 4 to 10 grains per 4 inch by 6 inch area. Thinner adhesive layers make the sheet material more readily damaged upon attempted transfer.

Patterned layer 16 between the pressure-sensitive adhesive layer and binder layer of the embodiment shown in FIG. 1 comprises a dye such as an ionic dye—i.e., a basic or acidic dye—which achieves two functions. First, it provides a visible image in the sheeting to further specialize the sheeting, and thereby provides a further feature identifying the sheeting as valid. Secondly, ionic dyes tend to release from the acrylic binder material upon heating of sheet material of the invention because their ionic character provides greater affinity to the pressure-sensitive adhesive than to the binder material.

The result of use of a patterned layer of ionic dye is that upon attempted removal of sheet material of the invention from a substrate to which it has been applied, in which the sheet material is first heated and then attempted to be pulled away from the substrate, the sheet material splits. In areas where the patterned layer containing ionic dye is present, the layer containing ionic dye (and the image provided by that layer) remains in place upon the substrate. Even if the rest of the sheet material is removed from the substrate, it cannot later be applied to a different substrate to falsely validate that substrate because a detectable portion of the sheet material is noticeably missing.

Useful ionic dyes include Basacid Blue NB 755, Basacid Yellow 226, and Basacid Red 316 (acidic dyes) and Flexored 481 (basic dye). All of these dyes are available from BASF Wyandotte. Other dyes besides ionic dyes also will provide greater affinity to the adhesive than to the binder material, or vice versa.

Figure 3:
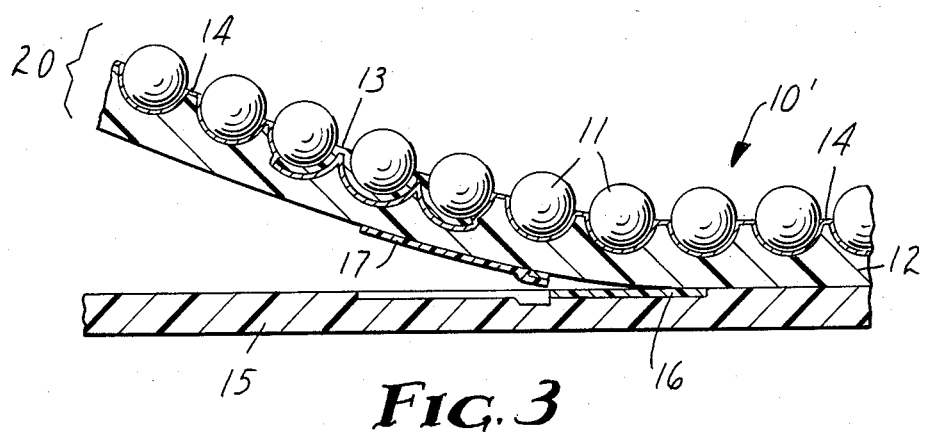
FIG. 3 is a sectional view showing the film of FIG. 2 during attempted removal from a substrate.

The second patterned layer 17, shown in FIGS. 2 and 3, may or may not be included, but is preferably included to further reveal any attempted transfer of sheet material of the invention. This layer comprises an adhesion-promoting material, preferably a nonpolar typically clear or unpigmented thermoplastic resin which promotes adhesion between the binder material and the pressure-sensitive adhesive upon heating. Suitable adhesion-promoting materials for this layer are acrylic polymers, which are of the same chemical class as the binder material and preferred pressure-sensitive adhesive.

Sheet material of the invention as shown in FIG. 2 splits in a more complicated manner upon attempted elevated-temperature removal of the sheet material from a substrate. The areas occupied by the nonpolar thermoplastic resin partially overlap the visibly imaged areas containing the ionic dye. Upon attempted transfer of the sheet material, as shown in FIG. 3, the areas containing nonpolar thermoplastic resin, including those parts of the ionic-dye-containing layer 16 overlapped by the nonpolar thermoplastic resin 17, tend to remain adhered to the binder material layer. The non-overlapped areas containing ionic dye tend to transfer to the pressure-sensitive adhesive layer, thereby splitting the visible image provided by the ionic dye and further revealing the attempted transfer.

A noticeable splitting of the sheet material of the invention is further enhanced by use of binder materials that are weak, e.g., because they are very thin, such as 10 to 100 micrometers; thicker layers of binder material, such as up to 250 micrometers, are also useful in sheet matrial of the invention. In such cases the binder material layer may split, e.g., even upon attempted room-temperature transfer, or upon elevated temperature removal especially in areas occupied by a nonpolar thermoplastic acrylic resin where the binder material layer tends to remain adhered to the pressure-sensitive adhesive layer.

The patterned layers typically are quite thin, e.g., on the order of 1-5 micrometers in thickness. They may be conveniently applied, for example, by flexo, gravure or letter press printing techniques.

In some embodiments of the invention only a single uncolored patterned layer of adhesion-promoting thermoplastic resin is included. In such cases, even if the binder material is strong, damage to the printed retroreflective image (i.e., the image 13 in FIGS. 1 and 2) occurs during attempted transfer because of the promoted adhesion between the binder material and pressure-sensitive adhesive.

The invention will be further illustrated by the following examples.

EXAMPLE 1

A security film was prepared having the structure shown in FIG. 1, preparing first the portion 20 by techniques taught in U.S. Pat. No. 3,801,183, and comprising as the layer 12 a low-molecular-weight acrylic polymer (Neocryl B-700 available from Polyvinyl Chemical Industries) dissolved or plasticized with 10-30% of dioctylphthalate. An image 16 was printed onto the bottom surface of the layer with an ionic dye, prepared by blending Basacid Blue NB 755 with a mixture of an isobutylmethacrylate polymer (Acryloid B67 available from Rohm and Haas) and a copolymer of isooctyl acrylate and acrylic acid. A thin layer of pressure-sensitive adhesive acrylic polymer was then coated from a latex dispersion (Rhoplex N619) to provide the pressure-sensitive adhesive layer 15.

Upon adhesion of the resulting product to a typical auto title paper, followed by heating of the assembly on a hot plate to a temperature of 100°-200° C. for several minutes and attempted removal of the film, the film split. The printed dye-colored image area 16 remained adhered to the substrate and pressure-sensitive adhesive layer. Any subsequent application of this removed film to another substrate would show the absence of the printed image.

EXAMPLE 2

A security film of the type shown in FIG. 2 was prepared. The portion 20 was the same as used in Example 1. The image area 16 was printed with a blue ink that comprised a mixture of isooctyl acrylate and acrylic acid in a 65:35 ratio in an amount of 8.4 weight-percent; (Acryloid B67), 0.4 weight-percent; ethanol, 62 weight-percent; Basacid Blue NB 755, 1.2%; and other solvents, 28 weight-percent.

In addition, a second patterned layer 17 was hand-printed with a release clear solution of Acryloid B67 in ethanol and isopropylacetate solvents at various solids levels (41%, 30%, and 15%), with portions of the layer 17 overlapping portions of the layer 16. A pressure-sensitive adhesive layer 15 as used in Example 1 was applied.

The resulting security film was adhered to printed paper, after which it was heated to 150° C. on a hot plate for several minutes, and removal attempted. For all of the samples, at all solids levels, the pressure-sensitive adhesive layer 15 delaminated from the layer 12 in most areas including the image areas 16 not covered by the clear layer 17. However the image transferred to the pressure-sensitive adhesive in the areas 16 and remained adhered to the printed paper. The clear layer 17, including portions of the image area 16 covered by the clear layer 17, remained adhered to the layer 12.

EXAMPLE 3

Example 2 was repeated except that the binder material comprised a blend of 50 weight-percent of Acryloid B67 and 50 weight-percent of a polymer based on methyl methacrylate (Acryloid B50). Results of thermal tampering were the same as in Example 2.

EXAMPLE 4

Example 2 was repeated except that the binder layer comprised a blend of 80 weight-percent of Acryloid and 20 weight-percent of an epoxidized soybean oil plasticizer (Paraplex G62 available from C. P. Hall Co.). Thermal tampering results were as indicated in Example 2.

What is claimed is:

1. A security film comprising a monolayer of transparent microspheres supported in a thin layer of binder material, the binder material comprising an acrylic low-molecular-weight polymer soluble in a nonpolar solvent; a pressure-sensitive adhesive coated onto the binder material; and at least a first patterned layer disposed between the pressure-sensitive adhesive and binder material layers and covering a portion of the interface between the two layers, said patterned layer comprising either (a) a dye having lower adhesion to the binder material than to the pressure-sensitive adhesive such that upon exposure of the complete film to an elevated temperature of 100° C. or more, the pressure-sensitive adhesive separates from the binder material in areas covered by the dye or (b) a nonpolar thermoplastic resin promoting adhesion between the binder material and pressure-sensitive adhesive such that upon exposure of the complete film to an elevated temperature of 100° C. or more, the pressure-sensitive adhesive tends to remain adhered to the binder material in areas covered by the adhesion-promoting resin.

2. A security film of claim 1 which includes both a first patterned layer comprising said dye and a second patterned layer comprising said nonpolar thermoplastic resin, said layers having overlapping portions and non-overlapping portions.

3. A security film of claim 1 in which the pressure-sensitive adhesive is applied from a latex.

4. A security film of claim 1 in which the pressure-sensitive adhesive comprises an acrylic polymer.

5. A security film of claim 3 in which the pressure-sensitive adhesive comprises an acrylic polymer.

6. A security film of claim 1 in which the nonpolar thermoplastic resin comprises an acrylic polymer.

7. A security film of claim 2 in which the pressure-sensitive adhesive is applied from a latex.

8. A security film of claim 2 in which the pressure-sensitive adhesive comprises an acrylic polymer.

9. A security film of claim 7 in which the pressure-sensitive adhesive comprises an acrylic polymer.

10. A security film of claim 2 in which the nonpolar thermoplastic resin comprises an acrylic polymer.

11. A security film of claim 9 in which the nonpolar thermoplastic resin comprises an acrylic polymer.

12. A security film of claim 11 in which the dye is an ionic dye dispersed in a vehicle that comprises an acrylic polymer.

* * * * *